UNITED STATES PATENT OFFICE 2,621,173

MONOAZO-DYESTUFFS

Max Schmid, Riehen, and Eduard Moser, Basel, Switzerland, assignors to Ciba Limited, Basel, Switzerland, a Swiss firm No Drawing. Application December 27, 1950, Serial No. 203,024. In Switzerland January 24, 1950

5 Claims. (Cl. 260—203)

According to this invention valuable new monoazo-dyestuffs are made by coupling a diazo compound of 1-amino-4-benzoylamino-2:5-dimethoxybenzene or 1-amino-4-phenoxyacetylamino-2:5-dimethoxybenzene, either of which may contain in the benzene nucleus of the acyl group a substituent not imparting solubility in water, with 2-hydroxynaphthalene-3-carboxylic acid-2':6'-dimethylanilide.

The amines, of which the diazo compounds are used as starting materials in the present process, may contain no substituents in the benzene nucleus of the acyl group, as in the case of the 1-amino-4-phenoxyacetylamino-2:5-dimethoxybenzene and in the case of the especially valuable 1-amino-4-benzoylamino-2:5-dimethoxybenzene. However, they may contain in the benzene nucleus of the acyl group substituents not imparting solubility in water, for example, lower alkyl or alkoxy groups, such as a butyl, ethyl, methyl, ethoxy or methoxy group or halogen atoms such as chlorine atoms. As examples of substituted amines of this kind there may be mentioned: 1-amino-4-(2'- or 3'- or 4'-methyl)-benzoylamino-2:5-dimethoxybenzene, 1-amino-4-(4-tertiarybutyl)-benzoylamino-2:5-dimethoxybenzene, 1-amino-4-(2'- or 3'- or 4'-chloro)-benzoylamino-2:5-dimethoxybenzene, or 1-amino-4-(2'- or 3'- or 4'-fluoro)-benzoylamino-2:5-dimethoxybenzene, 1-amino-4-(2'- or 4'-methoxy)-benzoylamino-2:5-dimethoxybenzene, 1-amino-4-(2'- or 4'-ethoxy)-benzoylamino-2:5-dimethoxybenzene and 1-amino-4-(4'-methyl)-phenoxyacetylamino-2:5-dimethoxybenzene.

The 2-hydroxynaphthalene-3-carboxylic acid-2':6'-dimethyl anilide used as coupling component in the present process is new and can be made by methods in themselves known, for example, by condensing a 2-hydroxynaphthalene-3-carboxylic acid halide or 2-hydroxynaphthalene-3-carboxylic acid itself with 2:6-dimethyl-1-aminobenzene. In the latter case the condensation is carried out for example, with the aid of a phosphorus halide.

The monoazo-dyestuffs may be produced, as is evident from the following examples, in substance or on a suitable substratum especially on textile fibers.

If desired the diazo-compounds may be used in the present process in the form of stabilized diazo-compounds, especially as diazo-amino-compounds of the diazo components and amino carboxylic acids or amino sulfonic acids or as zinc chloride double salts.

By adding urea to printing pastes prepared with such stabilized diazo-compounds and 2-hydroxynaphthalene-3-carboxylic acid- 2':6'-dimethylanilide, surprisingly powerful prints are obtained. The improvement in dyeing power normally produced by an addition of urea is very considerably exceeded in this case.

The new monoazo-dyestuffs correspond to the formula

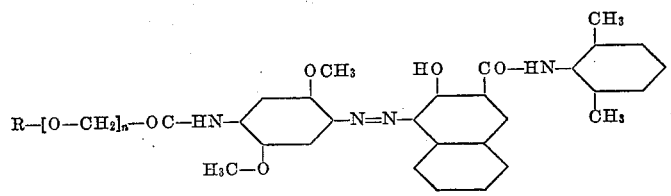

in which R stands for a benzene radical free from substituents imparting solubility in water, and $n$ represents 0 or 1.

Hitherto violet dyestuffs of this kind have been made by coupling 2-hydroxynaphthalene-3-carboxylic acid arylides with diazotized monobenzoyl-1:4-diaminobenzenes which are asymmetrically substituted in the 2:5-positions, for example, in one of these positions by a methoxy group and in the other by a methyl group or a chlorine atom. It is surprising that by coupling the 2-hydroxynaphthalene-3-carboxylic acid arylide used in this invention with the diazo compounds of the above defined constitution there are obtained not blue but markedly violet monoazo-dyestuffs.

The following examples illustrate the invention, the parts and percentages being by weight unless otherwise stated and the relationship of parts by weight to parts by volume being the same as that of the kilogram to the liter:

EXAMPLE 1

29.1 parts of 2-hydroxynaphthalene-3-carboxylic acid-2':6'-dimethylanilide are dissolved in 300 parts of water, 50 parts of alcohol and 14 parts of sodium hydroxide solution of 30 per cent. strength. By the addition of acetic acid while stirring well, the arylide is precipitated in the form of a fine suspension. To the suspension is added the diazo-solution prepared as follows:

27.2 parts of 1-amino-4-benzoylamino-2:5-dimethoxybenzene are stirred in 300 parts of water and mixed with 30 parts of hydrochloric acid of 30 per cent. strength. While cooling the mixture with ice water to 5-10° C., 25 parts of a 4N-solution of nitrile are poured in a thin stream.

The coupling mixture is maintained neutral to Congo throughout by the addition of sodium acetate. When the formation of the dyestuff has finished the mixture is filtered and the dyestuff of the formula

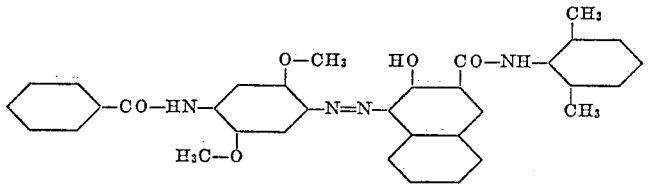

is washed well with water. It is dried in vacuo at 70° C. It is a strongly colored violet powder, which melts at 290° C. with decomposition after recrystallization from ortho-dichlorobenzene. It dissolves in concentrated sulfuric acid to give a greenish blue coloration and in an alcoholic solution of sodium hydroxide to give a brown-red coloration.

2-hydroxynaphthalene-3-carboxylic acid-2':6'-dimethylanilide may be prepared, for example, as follows:

94 parts of dry 2-hydroxynaphthalene-3-carboxylic acid are stirred in 600 parts of anhydrous chlorobenzene. 60.5 parts of 1-amino-2:6-dimethylbenzene are poured in and the whole is heated to 120° C. While stirring, a mixture of 30 parts of phosphorus trichloride and 30 parts of anhydrous chlorobenzene is introduced dropwise in the course of 2 hours at 120-130° C., and the mixture is maintained at that temperature for 8 hours. The whole is then allowed to cool to 80° C., 600 parts of water are poured in, and the chlorobenzene is distilled off by introducing steam. To the aqueous suspension of the condensation product there is added a quantity of sodium carbonate such as to slightly redden Brilliant Yellow paper, and the whole is allowed to cool while stirring, and is then filtered, and the 2-hydroxynaphthalene-3-carboxylic acid-2':6'-dimethylanilide is washed with hot water. It crystallizes from alcohol in the form of white crystals which melt at 190-191° C.

In the following table are given a few further dyestuffs which can be made in the same manner from 2-hydroxynaphthalene-3-carboxylic acid-2':6'-dimethylanilide, together with the properties of the dyestuffs:

| | Diazo-component | Color of the pigment | Coloration in concentrated sulfuric acid | Coloration in alcoholic NaOH | Melting point after recrystallization from orthodichlorobenzene |
|---|---|---|---|---|---|
| | | | | | ° C. |
| 1 | 1-amino-4-(2'-chlorobenzoylamino)-2:5-dimethoxybenzene. | violet | greenish blue | bluish red | 269 |
| 2 | 1-amino-4-(4'-chlorobenzoylamino)-2:5-dimethoxybenzene. | do | bluish green | brown-red | 298 |
| 3 | 1-amino-4-(4'-tertiary-butylamino)-2:5-dimethoxybenzene. | bluish violet | do | reddish violet | 274 |
| 4 | 1-amino-4-(4'-methyl)-phenoxyacetylamino-2:5-dimethoxybenzene. | violet | greenish blue | red brown | 287 |

The dyestuffs of the table correspond to the following formulae

No. 1

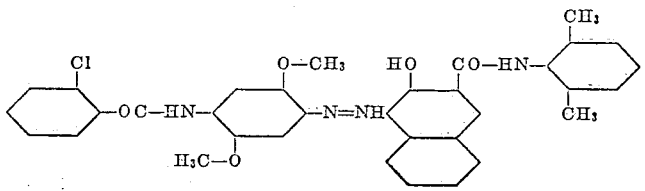

No. 2

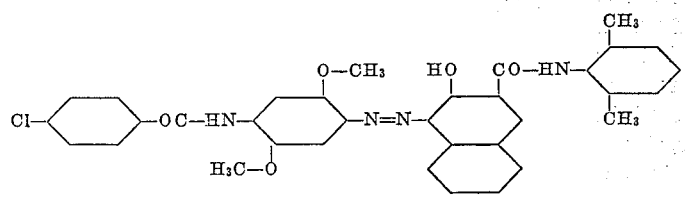

No. 3

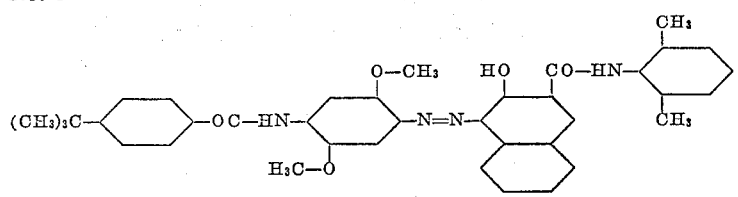

No. 4

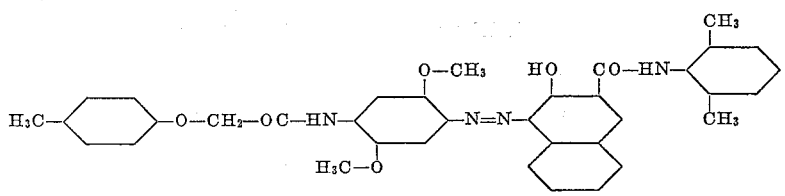

Dyestuffs of quite similar shades are obtained with the diazo compounds of the other amines listed in the second paragraph of the specification.

EXAMPLE 2

A grounding bath is prepared as follows: 10 parts of 2 - hydroxynaphthalene - 3 - carboxylic acid-2':6'-dimethylanilide are pasted with 15 parts of Turkey red oil and 20 parts of sodium hydroxide solution of 30 per cent. strength, and by gentle warming the naphtholate is formed. The whole is then mixed with 300 parts of water, boiled, and allowed to cool, and the solution is made up to 1000 parts by volume with cold water.

50 parts of cotton yarn, which has been boiled with sodium carbonate solution and rinsed well with water, are immersed in the grounding bath for 30 minutes. The yarn is then thoroughly centrifuged and developed in a bath prepared as follows:

Developing bath 10 parts of 1-amino-4-benzoylamino-2:5-dimethoxy-benzene are stirred with 12 parts of hydrochloric acid of 30 per cent. strength and 400 parts of cold water. 2.4 parts of sodium nitrite dissolved in 20 parts of water are then added, while stirring, and, after 20 minutes, the whole is filtered to remove a small amount of impurities. The mixture is made up to 1000 parts by volume with water, and neutralized by the addition of 8 parts of sodium acetate, and then 5 parts of sodium chloride are added.

The material is developed for ½ hour with occasional handling, then squeezed, and thoroughly washed with water, and boiled for ½ hour in a bath containing 3 grams of soap and 3 grams of anhydrous sodium carbonate in 1 liter of water. The material is then rinsed with hot and cold water and then dried. The yarn is dyed a pure bluish violet tint.

EXAMPLE 3

Cotton piece goods which have been thoroughly boiled with sodium carbonate solution and rinsed with water are grounded in a grounding bath prepared as described in Example 2 on a 3-roller foulard, and the material is then dried at 70° C. in a hot-flue apparatus.

The naphtholated goods are then printed with a printing color prepared as follows:

50 parts of the diazonium chloride of 1-amino-4-benzoylamino-2:5-dimethoxybenzene stabilized with zinc chloride and having a content of the base of 20 per cent. are dissolved in 350 parts of water, and the solution, after being freed from a small amount of impurities by filtration, is stirred in 600 parts of starch-tragacanth thickening.

The printed goods are dried at 70° C., rinsed with cold water, boiled for 15 minutes with a solution of 3 grams of soap and 3 grams of anhydrous sodium carbonate per liter of water, and then rinsed in hot and cold water and dried. A full bluish violet print is obtained.

EXAMPLE 4

A cotton fabric is printed with a printing paste consisting of 29.1 parts of 2-hydroxynaphthalene-3 - carboxylic acid - 2':6' - dimethylanilide, 44.4 parts of the diazoamino-compound from diazotized 1-amino-4-benzoylamino - 2:5 - dimethoxybenzene and the sodium salt of methylaminoethane sulfonic acid of the probable formula

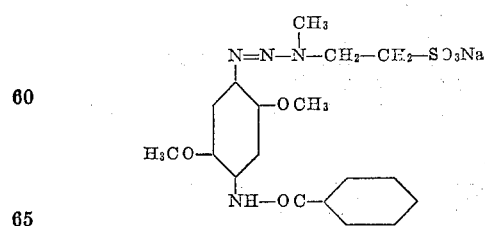

40 parts of Turkey red oil, 20 parts of alcohol, 30 parts of sodium hydroxide solution of 30 per cent. strength, 236.5 parts of water and 600 parts of neutral starch tragacanth thickening. The printed material is dried at 50–60° C., then steamed in a Mather-Platt apparatus for 5 minutes at 100° C., during which there are sprayed into the Mather-Platt apparatus having a capacity of about 120 meters of fabric per hour about 5 liters of a mixture of 1 part of acetic acid, 1 part of formic acid and 2 parts of water. The material is rinsed in the cold, treated for 10 minutes at 40–50° C. with an enzyme preparation in order to remove the starch, rinsed in the cold, soaped at the boil for 10 minutes, rinsed hot and cold, and dried. There is obtained a pure bluish violet print.

By using a printing paste having the composition:

- 29.1 parts of 2-hydroxynaphthalene-3-carboxylic acid-2':6'-dimethylanilide
- 44.4 parts of the above mentioned diazo-amino-compound,
- 50 parts of thiodiglycol,
- 50 parts of urea,
- 246.5 parts of water,
- 30 parts of sodium hydroxide solution of 30 per cent. strength,
- 550 parts of starch-tragacanth thickening 1000 parts there are obtained prints having similar tints but of considerably greater strength.

What we claim is:

1. A water-insoluble monoazo dyestuff of the formula

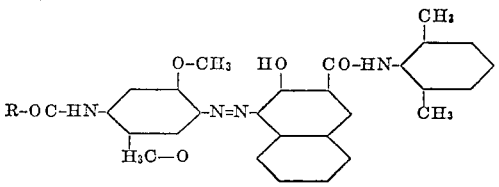

in which R stands for a benzene radical.

2. The monoazo dyestuff of the formula

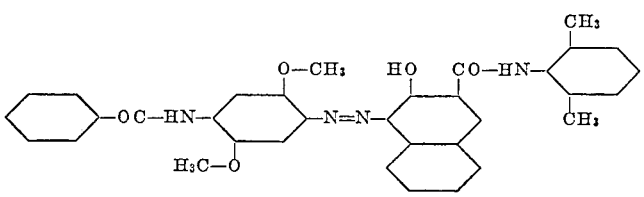

3. The monoazo dyestuff of the formula

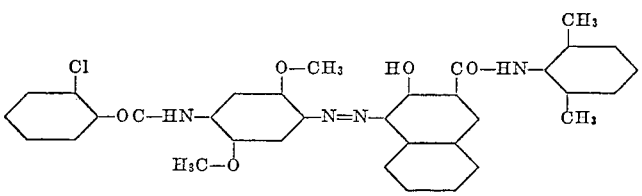

4. The monoazo dyestuff of the formula

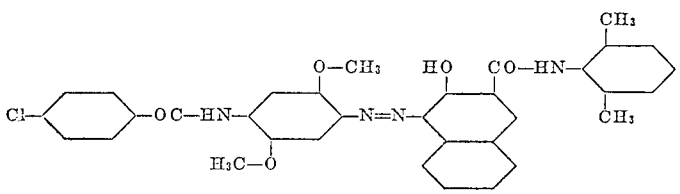

5. The monoazo dyestuff of the formula

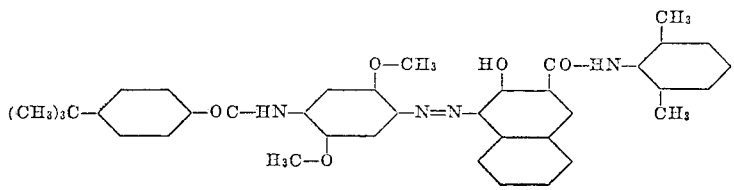

MAX SCHMID.
EDUARD MOSER.

REFERENCES CITED

The following references are of record in the file of this patent:

UNITED STATES PATENTS

| Number | Name | Date |
|---|---|---|
| Re. 17,364 | Wagner | July 2, 1929 |
| 2,027,764 | Bonhote | Jan. 14, 1936 |
| 2,132,846 | Dahlen | Oct. 11, 1938 |